(12) United States Patent
Vassberg et al.

(10) Patent No.: US 7,815,150 B2
(45) Date of Patent: Oct. 19, 2010

(54) BEAM DIRECTOR FLOW CONTROL

(75) Inventors: John C. Vassberg, Long Beach, CA (US); David T. Yeh, Irvine, CA (US); Mark A. DeHaan, Rancho Palos Verdes, CA (US); Neal A. Harrison, San Clemente, CA (US); Alan Z. Ullman, Northridge, CA (US); Michael W. Traffenstedt, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 645 days.

(21) Appl. No.: 11/841,481

(22) Filed: Aug. 20, 2007

(65) Prior Publication Data

US 2009/0052478 A1    Feb. 26, 2009

(51) Int. Cl.
*B64C 21/10* (2006.01)
(52) U.S. Cl. .................................. 244/200.1; 244/199.1
(58) Field of Classification Search .............. 244/200.1, 244/199.1, 200, 99.12, 130
See application file for complete search history.

(56) References Cited

U.S. PATENT DOCUMENTS

| | | | | |
|---|---|---|---|---|
| 4,174,083 A | * | 11/1979 | Mohn | 244/53 B |
| 4,696,442 A | * | 9/1987 | Mazzitelli | 244/53 B |
| 5,600,434 A | | 2/1997 | Warm et al. | |
| 5,974,072 A | | 10/1999 | Hartlove et al. | |
| 5,988,568 A | * | 11/1999 | Drews | 244/200 |
| 6,105,904 A | * | 8/2000 | Lisy et al. | 244/200.1 |
| 6,484,971 B2 | * | 11/2002 | Layukallo | 244/130 |
| 6,587,486 B1 | | 7/2003 | Sepp et al. | |
| 6,977,598 B2 | | 12/2005 | Longbottom | |
| 7,111,570 B1 | * | 9/2006 | Drews | 114/67 R |
| 7,248,341 B2 | | 7/2007 | Perry | |

* cited by examiner

*Primary Examiner*—Christopher P Ellis
(74) *Attorney, Agent, or Firm*—Lee & Hayes, PLLC

(57) ABSTRACT

Systems and methods are described for controlling flow disturbances emanating from a protrusion, such as a beam propagating device. In one embodiment, a method includes positioning a flow control element at least partially around a base portion of a protrusion, wherein the flow control element includes at least one flow expanding feature. A reduced pressure zone is generated proximate an aft portion of the protrusion by expanding at least a portion of a flowfield. One or more flow disturbances emanating downstream from the protrusion are deflected using the at least one reduced pressure zone.

20 Claims, 8 Drawing Sheets

BEAM DIRECTOR FLOW CONTROL

FIELD OF THE DISCLOSURE

The field of the present disclosure relates to systems and methods for flow control, and more specifically, to systems and methods that reduce flow disturbance around an aft-facing surface of a protuberance, enabling improved beam propagation therefrom.

BACKGROUND

Devices which propagate laser beams or other directed energy beams have been developed and integrated onto airborne platforms for various uses, including defending against airborne warfare objects, communications, ranging, mapping and guidance functions, and other suitable uses. When such devices are mounted on an airborne platform, the flow around the device creates flow disturbances downstream from the device which interfere with and inhibit a beam propagating downstream from the device. Thus, in the past, these devices have been most effective when the laser beam is propagated forward of the aircraft where there is relatively little interference of the beam by flow disturbances.

Traditional methods of addressing the flow disturbances present downstream of a beam propagating device include accepting a limited field of regard (FOR), placing the beam propagating device on the nose of the aircraft, or using active flow control elements to control the flow. The traditional methods of accepting a limited FOR and placing the beam propagating device on the nose of the aircraft are undesirable during missions that require the ability to propagate the beam omni-directionally, such as for defense missions. Although active flow control elements help reduce flow disturbances, these methods typically require complex arrays of actuators which can be costly and can be prone to mechanical failures. In addition, it is often difficult to find enough required extra space to implement the actuators or other components of active flow control elements. It is therefore desirable to provide a means to reduce flow disturbances within a region downstream of the beam propagating device, thus enabling the beam propagating device to effectively propagate a beam in any direction, in a compact and cost-efficient manner.

SUMMARY

The present disclosure is directed at passive flow control systems and methods that reduce flow disturbances within a region downstream of a beam propagating device. Techniques in accordance with the teachings of the present disclosure may advantageously enable beams, such as tactical laser weapons, to propagate omni-directionally from the beam propagating device. Embodiments of the present disclosure may also exhibit improved durability and reliability, and may be more compact and cost-efficient, in comparison with prior art flow control systems.

In one embodiment, a method for controlling flow disturbances within a flowfield over a protrusion disposed on a surface includes positioning a flow control element at least partially around a base portion of the protrusion proximate the surface, the flow control element including at least one flow expanding feature. At least one reduced pressure zone is generated proximate an aft portion of the protrusion by expanding at least a portion of the flowfield about the (at least one) flow expanding features of the flow control element. One or more flow disturbances emanating downstream from the protrusion are deflected using the (at least one) reduced pressure zones.

In another embodiment, an apparatus includes a surface, a protrusion projecting outwardly from the surface, and a flow control element. The flow control element is positioned at least partially around a base portion of the protrusion proximate the surface. The flow control element includes at least one flow expanding feature proximate an aft portion of the protrusion that is configured to expand at least a portion of a flowfield proximate the protrusion such that one or more flow disturbances emanating downstream from the protrusion are deflected.

In yet another embodiment, an assembly includes a vehicle having an outer surface and being moveable to form a flowfield over the outer surface, a beam propagating assembly projecting from the outer surface, and a flow control element. The beam propagating assembly is configured to provide a beam of energy directed through the flowfield. The flow control element is positioned at least partially around a base portion of the beam propagating assembly proximate the outer surface, and includes at least one flow expanding feature proximate an aft portion of the beam propagating assembly. The at least one flow expanding feature is configured to expand at least a portion of a flowfield proximate the beam propagating assembly such that one or more flow disturbances emanating downstream from the beam propagating assembly are deflected. In a particular embodiment, the vehicle is an aircraft.

The features, functions, and advantages that have been described above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Methods and systems for reducing flow disturbances over protuberances are described herein. Many specific details of certain embodiments are set forth in the following description and in FIGS. 1-11 to provide a thorough understanding of such embodiments. One skilled in the art will understand, however, that the invention may have additional embodiments, or that alternate embodiments may be practiced without several of the details described in the following description.

By way of overview, embodiments of the present disclosure provide for controlling the flow of a medium around a beam propagating device (or other protuberance) where a laminar flow field is desired downstream of the beam source element. Passive flow control devices are used to generate vortices which draw flow disturbances away from the area downstream of the beam source element. Drawing flow disturbances away from the area downstream of the beam propagating device enables the beam propagating device to effectively propagate a beam downstream of the device.

Figure 1:
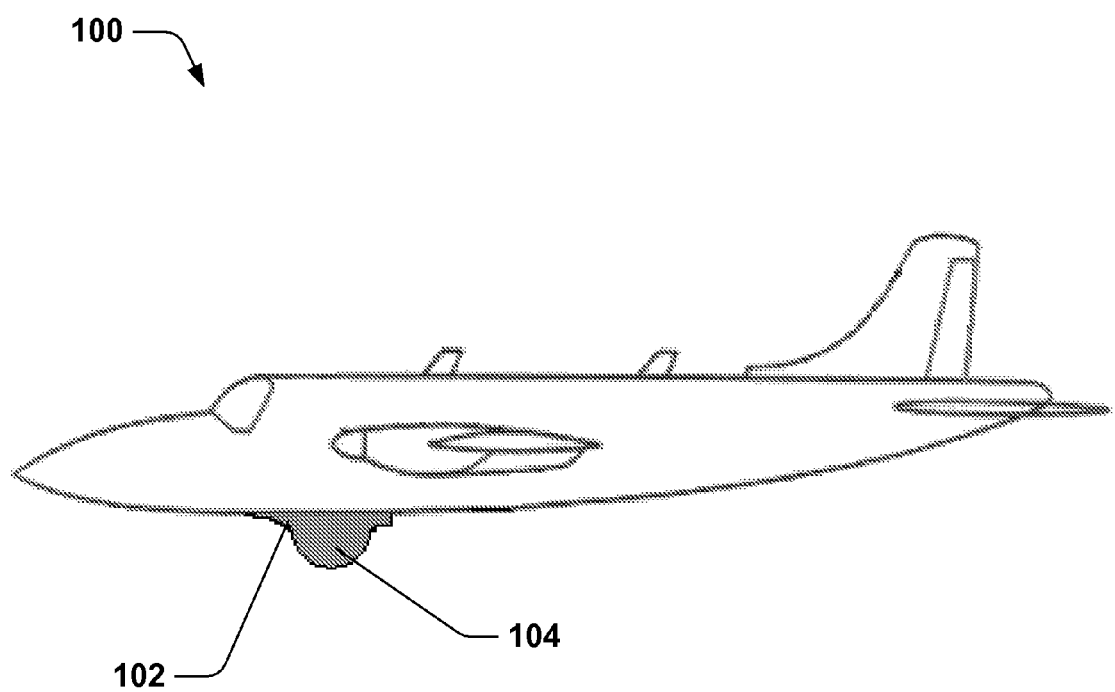
FIG. 1 is a side view of an aircraft that includes a flow control element positioned proximate a beam propagating device in accordance with an embodiment of the present disclosure.

FIG. 1 is an exemplary aircraft 100 for implementing systems and methods for controlling flow around a beam propagating device 104 in accordance with one embodiment of the present disclosure. In this embodiment, a flow control element 102 is adjacent to and surrounds the beam propagating device 104. Both the flow control element 102 and the beam propagating device 104 are positioned on a lower surface of a fuselage portion of the airplane 100. It will be appreciated, however, that in alternate embodiments, the flow control element 102 and the beam propagating device 104 may be located on an upper fuselage surface, a lateral fuselage surface, wing and tail surfaces, or on any other suitable portions on the aircraft 100. In further embodiments, the beam propagating device 104 may be positioned on a surface of any type of vehicle or device that moves through a medium, including missiles, unmanned aerial vehicles, automobiles, trains, watercraft, or other moveable devices.

The beam propagating device 104 may be of generally known construction, and may be any device that generates and steers a beam of energy into the surrounding flowfield for any desired purpose, including airborne defense, communications, ranging, mapping, and guidance functions, sensing or research activities, or for any other desired functions. The construction and operational aspects of the beam propagating device 104 may be consistent with any of those devices generally known in the relevant art. Suitable beam propagating devices include those devices generally described, for example, in U.S. Pat. No. 7,248,341 issued to Perry, U.S. Pat. No. 6,977,598 issued to Longbottom, U.S. Pat. No. 6,587,486 issued to Sepp and Protz, U.S. Pat. No. 5,974,072 issued to Hartlove et al., and U.S. Pat. No. 5,600,434 issued to Warm et al., and also include beam director devices such as those developed by Metastable Instruments Inc. of St. Peters, Mo., by the company formerly known as Hughes Aircraft Co. of Culver City, Calif., and by TRW, Inc. of Redondo Beach, Calif. Therefore, for the sake of brevity, the construction and operational aspects of the beam propagating device 104 will not be described in detail herein.

Figure 2:
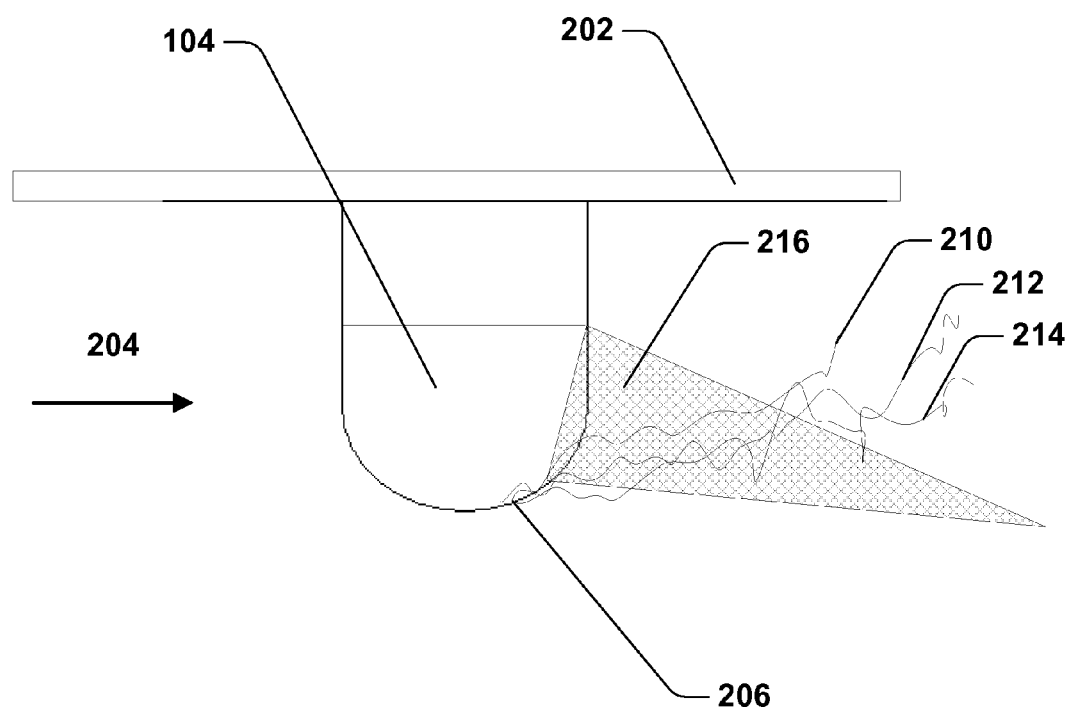
FIG. 2 is a side view of the beam propagating device of FIG. 1 and a flow field that exists without any flow control elements in accordance with the prior art.

FIG. 2 is an enlarged side view of the beam propagating device 104 of the prior art (i.e. without the flow control element 102). Here, the beam propagating device 104 is mounted to a surface 202 such as the lower surface of an aircraft. The direction of the medium flow is indicated by arrow 204. In alternate embodiments, the beam propagating device 104 may be any type of protuberance, and the medium may be air or any other suitable fluid or gaseous medium. As the medium flows around the beam propagating device 104, the medium tends to separate at a separation point 206 as the medium flows over the beam propagating device 104. As the medium separates, flow disturbances 210-214 such as wake turbulence or chaotic vortices are created. These flow disturbances 210-214 prevent the beam propagation device 104 from effectively propagating a beam 216 downstream from the beam propagation device. In FIG. 2, the range from which the beam propagation device 104 can effectively propagate a beam is limited to areas generally upstream from the separation point 206 on the beam propagation device 104 where there is relatively little distortion of the beam by flow disturbances 210-214. Thus, there is a need for systems and methods that reduce flow disturbances present downstream from the beam source element so that the beam propagation device can effectively propagate a beam omni-directionally from the device.

Figure 3:
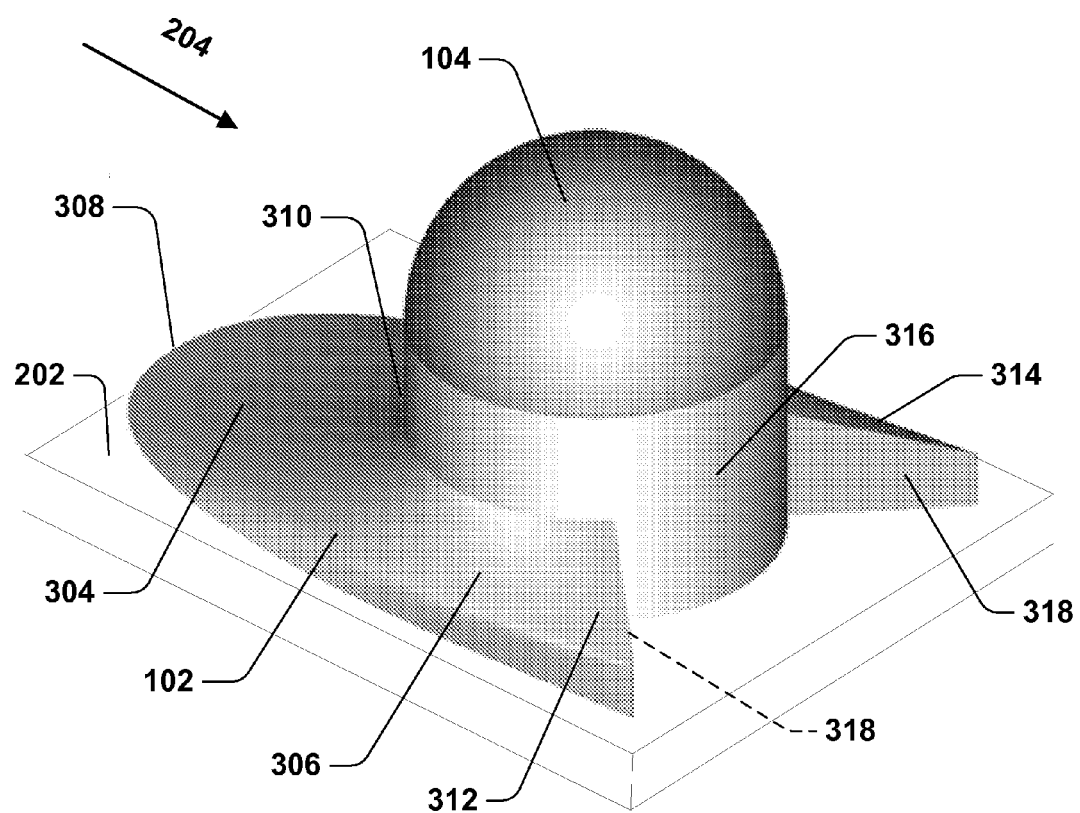
FIG. 3 is an inverted isometric view of the beam propagating device of FIG. 2 coupled with a flow control element in accordance with an embodiment of the present disclosure.

FIG. 3 is an isometric view of one embodiment of the flow control element 102 of FIG. 1 positioned proximate the beam propagating device 104 in accordance with an embodiment of the present disclosure. In FIG. 3, the beam propagating device 104 and the flow control element 102 are shown in an inverted position for clarity. The flow control element 102 is attached to the surface 202 and is disposed partially around the beam propagating device 104. In this embodiment, the flow control element 102 generally includes an upstream portion 304 and a downstream portion 306. The flow control element 102 can be a separate structure from the surface 202 or it can be integrally formed with the surface 202. Where the flow control element 102 and the surface 202 are separate entities, the flow control element 102 can be attached to the surface using any one of various attachment methods such as rivets. In some embodiments, the surface 202 is non-planar (e.g. convex), such as a fuselage surface of the aircraft 100, and a bottom surface of the flow control element 102 (not visible) may be contoured to the shape of the surface 202. The height of the upstream portion 304 of the flow control element 102 tapers from a minimum at the upstream leading edge 308 to an intersection point 310 where the upstream portion of the flow control element 102 meets the beam propagation device 104. The downstream portion 306 of the flow control element 102 comprises a pair of trailing edge portions 312, 314 proximate an aft-facing, downstream side 316 of the beam propagating device 104. In one embodiment, the trailing edge portions 312, 314 each include an aft step 318.

Figure 4:
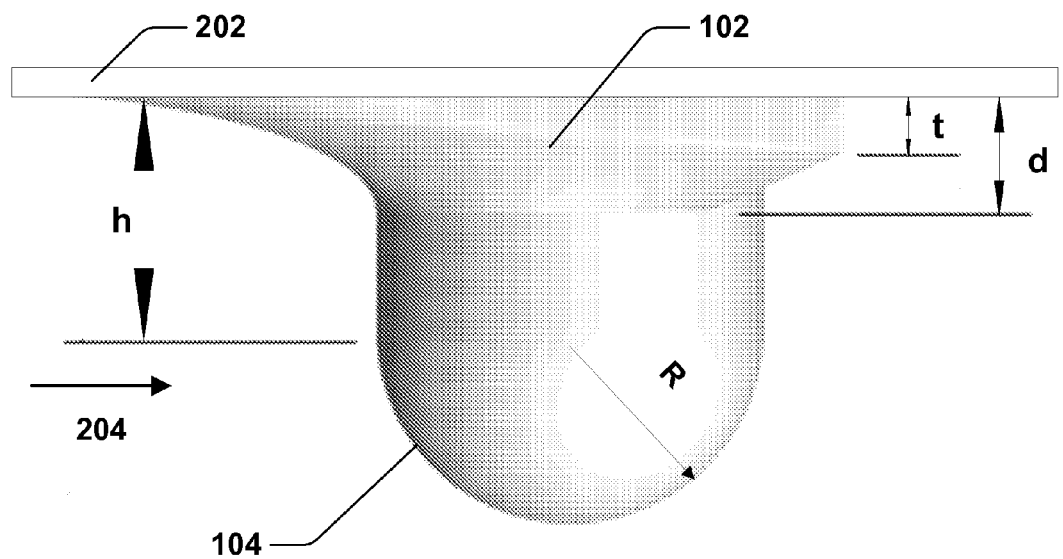
FIGS. 4 and 5 are side and plan views, respectively, of the beam propagating device and flow control element of FIG. 3.
Figure 5:
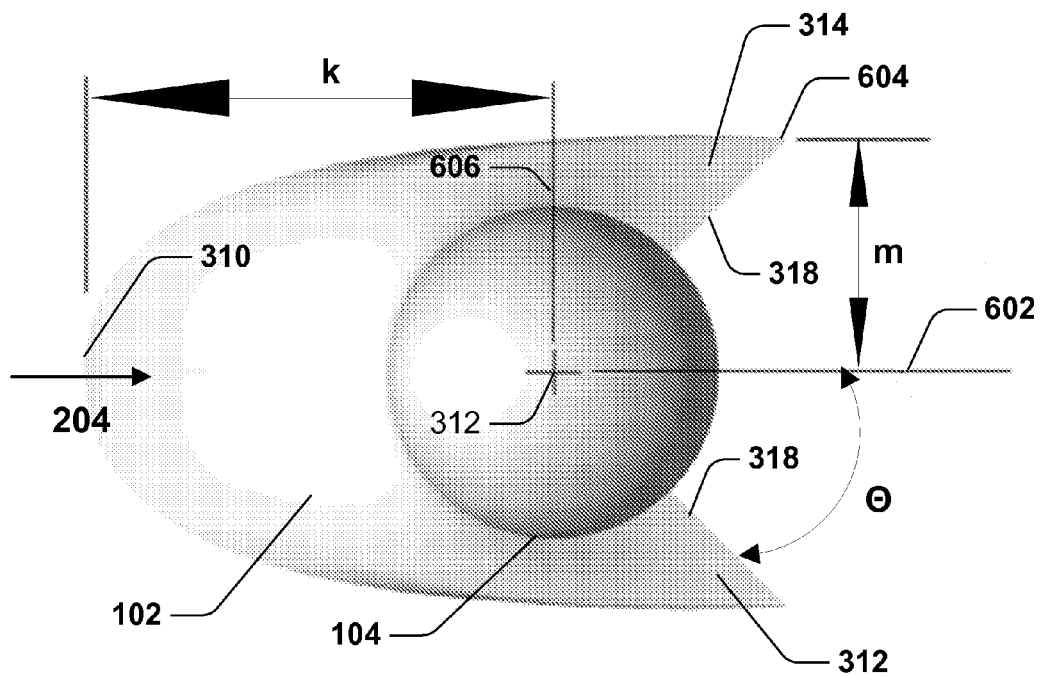

FIGS. 4 and 5 are side and plan views, respectively, of the beam propagating device 104 and flow control element 102 of FIG. 3. In this embodiment, the aft step 318 has an outer height (or thickness) "t", and an inner height "d". In a particular embodiment, the outer height t is approximately 4 inches, and the inner height d is approximately 8 inches. Similarly, the beam propagating device 104 has a hemispherical end with a radius "R" and a height "h". In a particular embodiment, the radius R is approximately 6.5 inches and the height is approximately 16 inches, although these values may be varied depending upon design requirements and operating conditions. In FIG. 5, the aft step 318 of the trailing edge portions 312-314 has a sweep angle "Θ" with respect to a centerline 602 of the flow control element 102, and a distance "m" from a tip 604 of the trailing edge portions 312, 314 to the centerline 602. In a particular embodiment, the sweep angle Θ may be approximately 45 degrees, and the distance m may be approximately 18.38 inches. The flow control element 102 extends upstream from a center 606 of the beam propagating device 104 to a leading edge 310 of the flow control element 102 by a distance "k" which, in one particular embodiment, is approximately 19.5 inches. In other embodiments, depending upon the anticipated operating conditions of the flow control element 102, the distance k can be generally equal to 1.5 times the diameter 2R of the hemispherical end of the beam control element 104.

Figure 6:
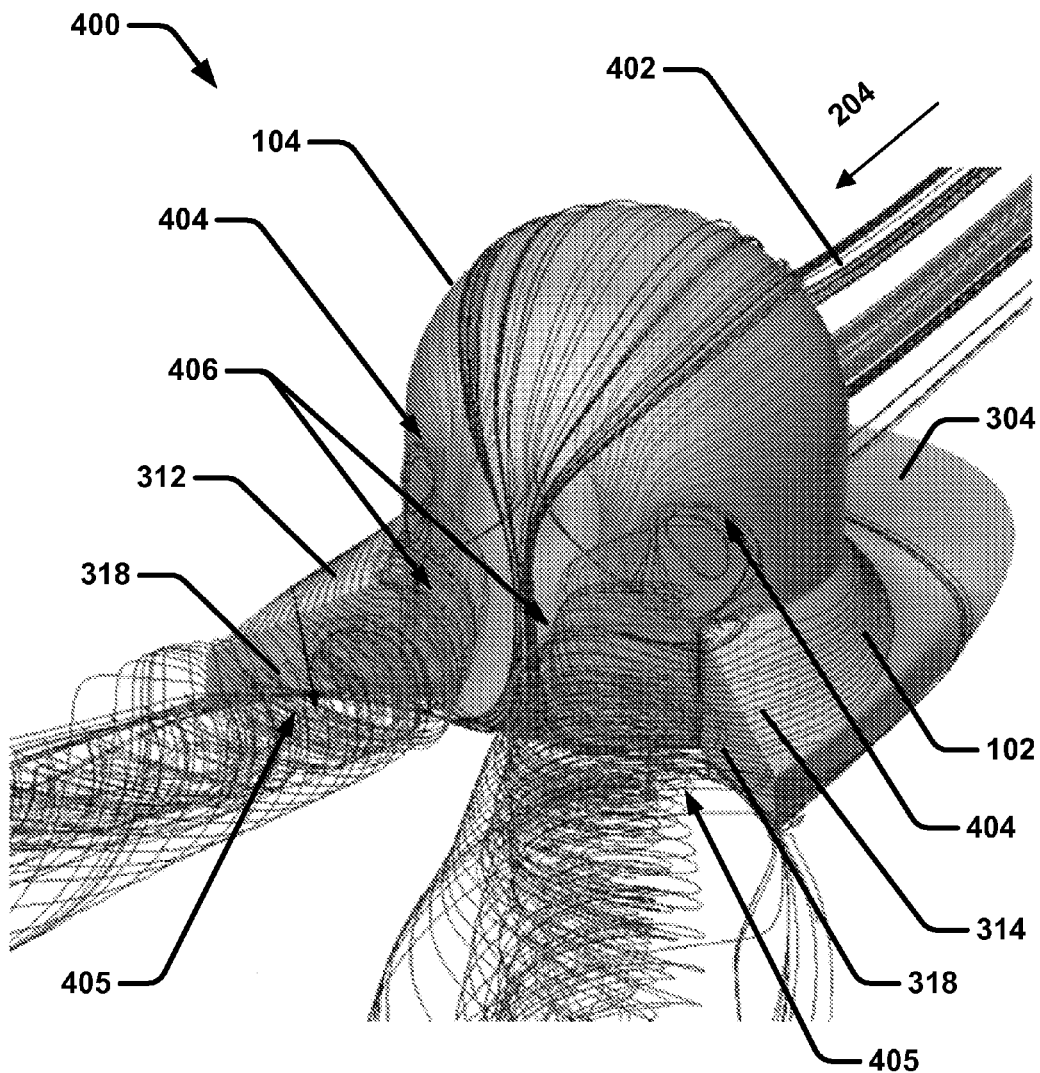
FIGS. 6-8 are isometric and elevational views of the flow control element in operation with the beam propagating device of FIG. 3 and a resulting flow field.
Figure 7:
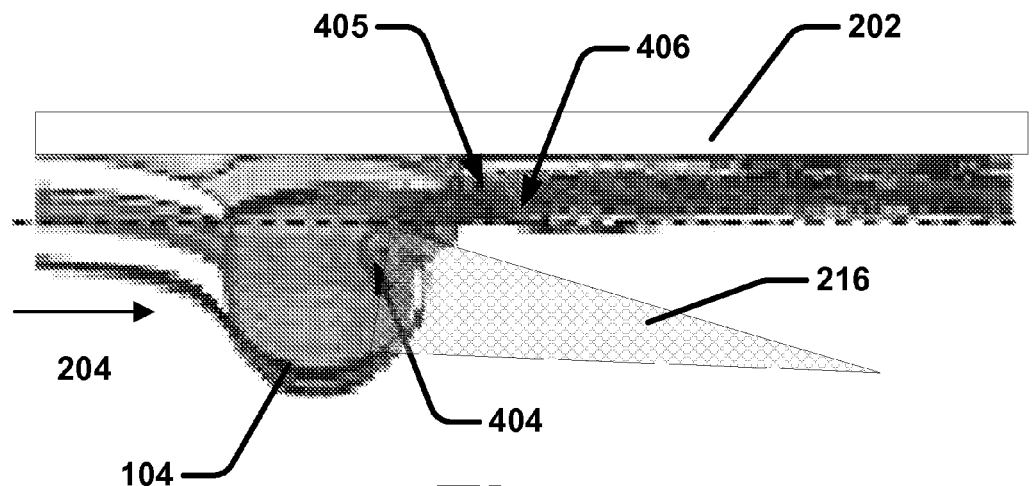
Figure 8:
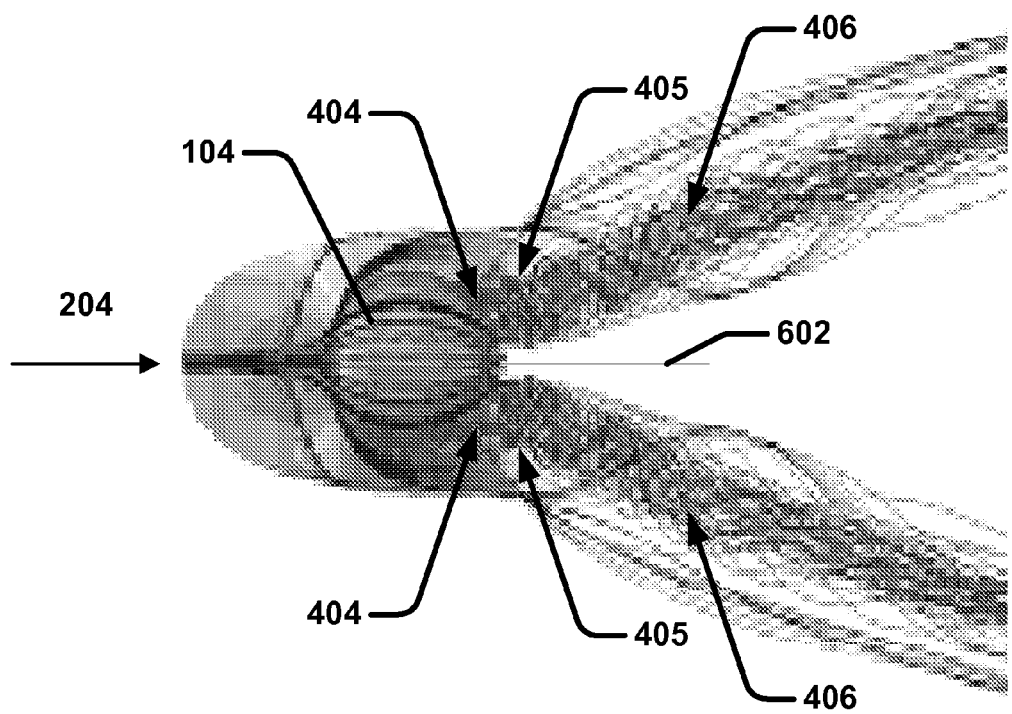

FIGS. 6-8 are isometric and elevational views of the flow control element 102 in operation with the beam propagating device 104 of FIG. 3, and a resulting flow field 400. Again, the direction of the medium flow is indicated by arrow 204. The medium flow 204 traverses over the first portion 304 of the flow control element 102, as exhibited by the relatively smooth, undisturbed streamlines 402 shown in FIG. 6. In some embodiments, the first portion 304 of the flow control element 102 may attempt to control a boundary layer upstream of the beam propagating device 104 and in order to attempt to reduce the effects of flow disturbances upstream of the beam propagating device 104. As the medium flows over the beam propagating device 104, the flow eventually separates at a pair of separation zones 404 on an aft-facing portion of the beam propagating device 104.

As the medium flows over the second portion 306 of the flow control element 102, the flow crosses the aft step 318 of each of the trailing edge portions 312, 314. The expansion of the flow around each of the aft steps 318 creates a region of low pressure 405 downstream of each of the trailing edge portions 312, 314 of the flow control element 102. Vortices 406 and other flow disturbances (e.g. disturbances 210-214 of FIG. 2) emanating from the beam propagating device 104 are drawn toward the surface 202 by the low pressure regions 405. As best shown in FIG. 7, the low pressure regions 405 may effectively pull the vortices 406 and other flow disturbances toward the surface 202 (e.g. a lower surface of an aircraft) allowing the beam propagating device 104 to more effectively propagate a beam 216 downstream from the beam propagating device 104. Furthermore, as best shown in FIG. 8, the low pressure regions 405 created by the aft steps 318 may also pull the vortices 406 and other flow disturbances within the flow laterally outwardly from the centerline 602 (FIG. 5), further improving a field of view downstream of the beam propagating device 104 for the propagation of the beam 216 (FIG. 7).

Figure 9:
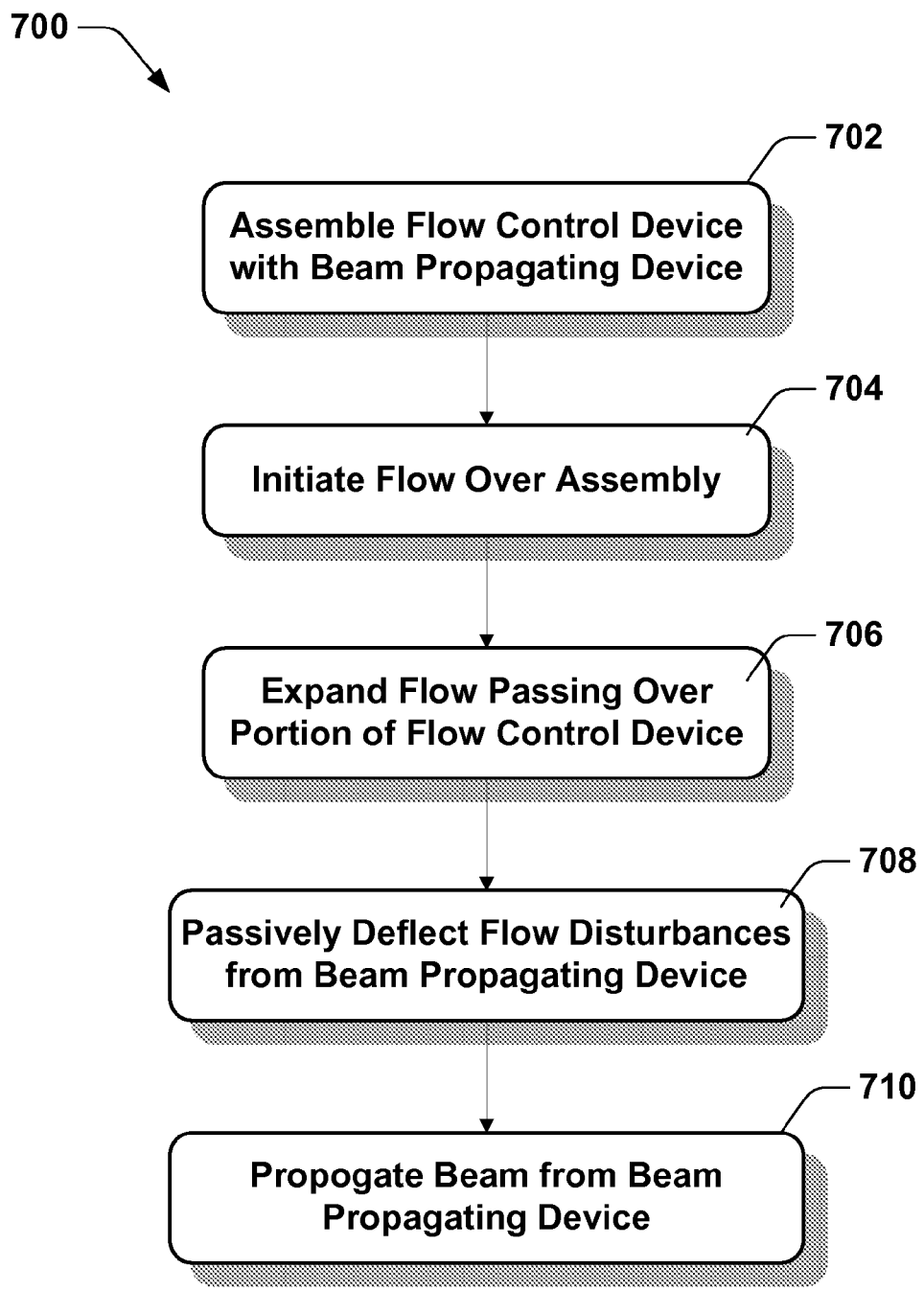
FIG. 9 is a flowchart of a method of controlling flow over a beam propagating device in accordance with an embodiment of the present disclosure.

FIG. 9 is an exemplary method 700 for controlling the flow around a beam propagating device in accordance with another embodiment of the invention. The method 700 is illustrated as a collection of blocks in a logical flow graph, which represents a sequence of operations that can be implemented to control the flow of a medium around a beam source element. For simplicity, the method 700 is described with reference to the exemplary embodiment of the flow control element 102 and beam propagating device 104 described above with reference to FIGS. 1-8.

In this embodiment, the method 700 includes assembling a flow control device with a beam propagating device into an operational assembly at 702. For example, in one particular embodiment, the beam propagating device may be coupled to an aircraft surface, such as the lower fuselage surface 202 of the aircraft 100, and the flow control element 102 may be positioned proximate to the beam propagating device 104 as described above. At 704, a flow is initiated over the operational assembly. More specifically, the flow may traverse across a forward portion of the flow control device and over at least a portion of the beam propagating device. As the flow passes the operational assembly, at least a portion of the flow that passes over the flow control device is expanded at 706. In some embodiments, the flow may be expanded over one or more corners or turning angles of the flow control device, such as the aft steps 318 of the trailing edge portions 312, 314 of the flow control element 102. The expansion of the flow may cause at least one reduced pressure zone within the flowfield downstream of the beam propagating device. At 708, flow disturbances (including possible vortices, turbulence, etc.) emanating from an aft portion of the beam propagating device may be passively deflected by the at least one reduced pressure zone. In some embodiments, the disturbances are deflected by the one or more reduced pressure zones toward the surface from which the beam propagating device projects (e.g. the lower fuselage surface 202 of the aircraft 100). The disturbances may also be deflected laterally away from a centerline of the flowfield (e.g. centerline 602 of FIGS. 5 and 8) that extends downstream from the beam propagating device. The deflection of the flow disturbances may improve a flow condition within a propagation zone (or field of view) downstream of the beam propagating device through which a beam may be more effectively propagated. The method 700 may further include propagating a beam from the beam propagating device through the propagation zone at 710.

Figure 10:
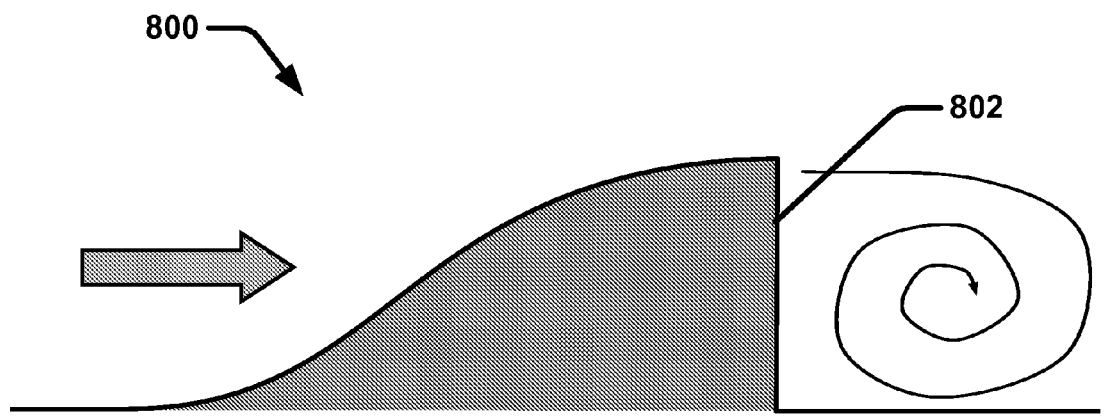
FIGS. 10 and 11 are side cross-sectional views of flow control elements in accordance with alternate embodiments of the present disclosure.

It will be appreciated that a variety of alternate embodiments may be conceived, and that the invention is not limited to the particular embodiments described above with reference to FIGS. 1-9. For example, the shape of the flow control element may be adjusted in various ways to suit the needs of a particular application or design requirement. An alternate embodiment of a flow control element 800 is shown in FIG. 10. In FIG. 10, the flow control element 800 may represent a side cross-sectional view of an element having an aft step 802 that is swept at a sweep angle $\Theta$ that is less than 90 degrees, such as the embodiment shown in FIG. 5. Alternately, the flow control element 800 of FIG. 10 may represent a side cross-sectional view of an element wherein the aft step 802 extends laterally across the flow (i.e. the sweep angle $\Theta$ is 90 degrees) or may even represent an embodiment wherein the aft step 802 is forwardly-swept such that the sweep angle $\Theta$ is greater than 90 degrees.

Figure 11:
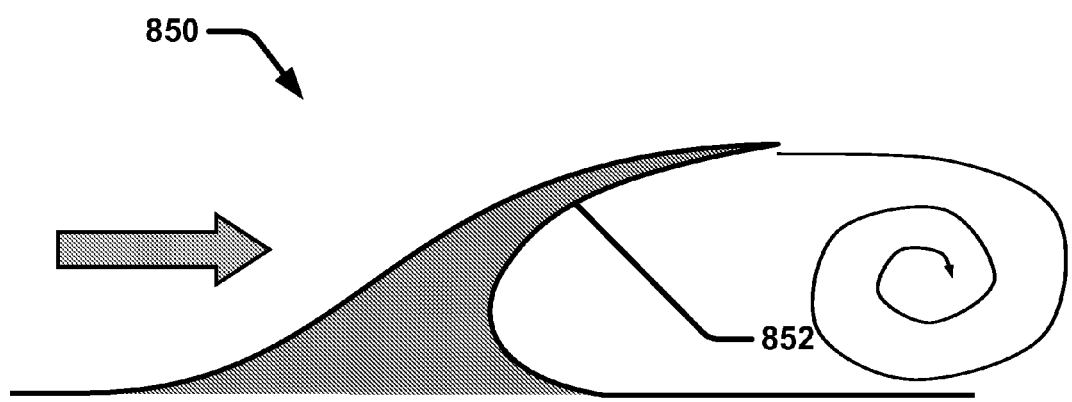

Similarly, FIG. 11 is a side cross-sectional views of a flow control element 850 in accordance with another alternate embodiment of the present disclosure. In this embodiment, the aft step (or aft surface) 852 is non-planar (or concave). As in the previously described embodiments, the aft step 852 may be aftwardly swept (e.g. $\Theta$ less than 90 degrees), may have no sweep (e.g. $\Theta$ equal to 90 degrees), or may even be forwardly swept (e.g. $\Theta$ greater than 90 degrees). Although the non-planar aft step 852 is shown in FIG. 11 as having continuous curvature, and the planar aft step 802 of FIG. 10 is shown as being continuously planar, in still further embodiments, aft steps in accordance the present disclosure may include various combinations of curved and planar portions to achieve the desired flow control results. Similarly, various combinations of thickness tapering (and non-tapering) of the aft steps may also be conceived to achieve the desired flow control results.

Embodiments of techniques in accordance with the teachings of the present disclosure may provide considerable advantages over the prior art. For example, techniques in accordance with the present disclosure may provide a passive method of controlling disturbances emanating from a protuberance, such as a beam propagating device. By varying a position of such disturbances, embodiments of the present disclosure may enable beam propagation from aft portions of the beam propagating device through portions of a flowfield that were not previously practical or possible using prior art devices. Furthermore, embodiments of techniques in accordance with the present disclosure provide the improved functionality passively, using a simple, cost-effective flow control device requiring little or no space within the aircraft or other suitable platform. Finally, techniques in accordance with the present disclosure may provide improved durability and reliability in comparison with prior art methods.

While specific embodiments of the present disclosure have been illustrated and described herein, as noted above, many changes can be made without departing from the spirit and scope of the invention. Accordingly, the scope of the invention should not be limited by the disclosure of the specific embodiments set forth above. Instead, the scope of various embodiments in accordance with the teachings of the present disclosure should be determined entirely by reference to the claims that follow.

What is claimed is:

1. A method for controlling flow disturbances within a flowfield over a protrusion disposed on a surface, comprising:
   positioning a flow control element at least partially around a base portion of the protrusion proximate the surface, the flow control element including at least one flow expanding feature;
   generating at least one reduced pressure zone proximate an aft portion of the protrusion by expanding at least a portion of the flowfield about the at least one flow expanding feature of the flow control element; and
   deflecting one or more flow disturbances emanating downstream from the protrusion using the at least one reduced pressure zone.

2. The method of claim 1, wherein the flow control element includes at least one aft step, and wherein expanding at least a portion of the flowfield includes expanding at least a portion of the flowfield over the at least one step.

3. The method of claim 2, wherein the at least one step has an inner height proximate the protrusion and an outer height spaced apart from the protrusion, the inner height being greater than the outer height.

4. The method of claim 1, wherein the flow control element includes a pair of trailing edge portions proximate an aft portion of the protrusion, each trailing edge portion including a rearwardly-swept aft step that is tapered from a first thickness proximate the protrusion to a second thickness distally spaced from the protrusion, and wherein expanding at least a portion of the flowfield includes expanding at least a portion of the flowfield over the aft steps of the trailing edge portions of the flow control element.

5. The method of claim 1, wherein deflecting one or more flow disturbances emanating downstream from the protrusion includes deflecting one or more flow disturbances at least one of toward the surface and laterally outwardly across the surface.

6. The method of claim 1, wherein the flow control element comprises a first part and a second part, the first part being positioned upstream of the protrusion and the second part positioned adjacent to and downstream from the first part, wherein the first part thickens continuously along a centerline from an upstream edge to a point where the flow control element meets the protrusion, and wherein the second part includes the at least one flow expanding feature comprising at least one downstream facing step.

7. The method of claim 6, wherein deflecting one or more flow disturbances emanating downstream from the protrusion includes deflecting at least one vortex emanating from the protrusion using the at least one reduced pressure zone formed by the at least one downstream facing step.

8. The method of claim 1, wherein the protrusion comprises a beam propagating device, the method further comprising propagating a beam of energy through a portion of the flowfield downstream from the beam propagating device.

9. The method of claim 8, wherein deflecting one or more flow disturbances includes siphoning the flow disturbances away from an area downstream of the beam propagating device to improve propagation of the beam of energy through the area.

10. An apparatus, comprising:
    a surface;
    a protrusion projecting outwardly from the surface;
    a flow control element positioned at least partially around a base portion of the protrusion proximate the surface, the flow control element comprising at least one flow expanding feature proximate an aft portion of the protrusion configured to expand at least a portion of a flowfield proximate the protrusion such that one or more flow disturbances emanating downstream from the protrusion are deflected.

11. The apparatus of claim 10, wherein the at least one flow expanding feature includes at least one aft step configured to form at least one reduced pressure region within the flowfield to deflect the one or more flow disturbances.

12. The apparatus of claim 11, wherein the at least one step has an inner height proximate the protrusion and an outer height spaced apart from the protrusion, the inner height being greater than the outer height.

13. The apparatus of claim 10, wherein the at least one flow expanding feature includes a pair of trailing edge portions proximate an aft portion of the protrusion, each trailing edge portion including a rearwardly-swept aft step that is tapered from a first thickness proximate the protrusion to a second thickness distally spaced from the protrusion, each rearwardly-swept aft step being configured to expand at least a portion of the flowfield.

14. The apparatus of claim 13, wherein the rearwardly-swept aft steps are further configured to deflect the one or more flow disturbances at least one of toward the surface and laterally outwardly across the surface.

15. The apparatus of claim 10, wherein the flow control element comprises a first part and a second part, the first part being positioned upstream of the protrusion and the second part positioned adjacent to and downstream from the first part, wherein the first part thickens continuously along a centerline from an upstream edge to a point where the flow control element meets the protrusion, and wherein the second part includes the at least one flow expanding feature comprising at least one downstream facing step.

16. The apparatus of claim 15, wherein the first part is configured to control a boundary layer upstream of the protrusion.

17. The apparatus of claim 10, wherein the protrusion comprises a beam propagating device configured to propagate a beam of energy through a portion of the flowfield downstream from the beam propagating device.

18. The apparatus of claim 1, wherein the surface comprises a non-planar surface, and wherein the flow control element is contoured to conform to a shape of the surface proximate the protrusion.

19. An assembly, comprising:
    a vehicle having an outer surface and being moveable to form a flowfield over the outer surface;
    a beam propagating assembly projecting from the outer surface and configured to provide a beam of energy directed through the flowfield;
    a flow control element positioned at least partially around a base portion of the beam propagating assembly proximate the outer surface, the flow control element comprising at least one flow expanding feature proximate an aft portion of the beam propagating assembly and configured to expand at least a portion of a flowfield proximate the beam propagating assembly such that one or more flow disturbances emanating downstream from the beam propagating assembly are deflected.

20. The assembly of claim 19, wherein the vehicle comprises an aircraft.

* * * * *